(12) United States Patent
Wang

(10) Patent No.: US 11,378,776 B2
(45) Date of Patent: Jul. 5, 2022

(54) CAMERA OPTICAL LENS

(71) Applicant: AAC Optics Solutions Pte. Ltd., Singapore (SG)

(72) Inventor: Kang Wang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 331 days.

(21) Appl. No.: 16/835,293

(22) Filed: Mar. 30, 2020

(65) Prior Publication Data
US 2021/0263273 A1 Aug. 26, 2021

(30) Foreign Application Priority Data
Feb. 24, 2020 (CN) .......................... 202010111304.0

(51) Int. Cl.
*G02B 9/60* (2006.01)
*G02B 13/00* (2006.01)

(52) U.S. Cl.
CPC ........... *G02B 9/60* (2013.01); *G02B 13/0045* (2013.01)

(58) Field of Classification Search
None
See application file for complete search history.

(56) References Cited

U.S. PATENT DOCUMENTS

| 8,917,458 | B2* | 12/2014 | Tsai | ................... | G02B 13/0045 |
| | | | | | 359/764 |
| 9,091,842 | B2* | 7/2015 | Kwon | .................... | G02B 13/18 |
| 2015/0138421 | A1* | 5/2015 | Chang | ................. | H04N 5/2252 |
| | | | | | 359/764 |
| 2015/0253538 | A1* | 9/2015 | Ye | ............................ | G02B 9/60 |
| | | | | | 359/764 |
| 2016/0103298 | A1* | 4/2016 | Liao | ................... | G02B 13/0045 |
| | | | | | 359/764 |
| 2016/0154208 | A1* | 6/2016 | Teraoka | ............ | G02B 13/0045 |
| | | | | | 359/764 |

* cited by examiner

*Primary Examiner* — Darryl J Collins
(74) *Attorney, Agent, or Firm* — W&G Law Group

(57) ABSTRACT

The present disclosure a camera optical lens comprising, from an object side to an image side, a first lens having a positive refractive power, a second lens having a negative refractive power, a third lens having a positive refractive power, a fourth lens having a positive refractive power, and a fifth lens having a negative refractive power, the camera optical lens satisfying conditions of 0.50≤R5/R6≤0.75, 0.80≤f1/f≤1.00, 0.80≤d3/d4≤1.15, 1.65≤d7/d8≤2.50 and 0.00≤R4. The camera optical lens can achieve excellent optical characteristics while meeting the designing requirement for having a large aperture and being wide-angle and ultra-thin.

10 Claims, 6 Drawing Sheets

CAMERA OPTICAL LENS

TECHNICAL FIELD

The present disclosure relates to the field of optical lens, particular, to a camera optical lens suitable for handheld devices, such as smart phones and digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market. In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality is improving constantly, the five-piece lens structure gradually appears in lens designs. There is an urgent need for an ultra-thin camera optical lens achieving excellent optical characteristics.

BRIEF DESCRIPTION OF DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF EMBODIMENTS

The present disclosure will be further described with reference to the accompanying drawings and embodiments in the following.

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
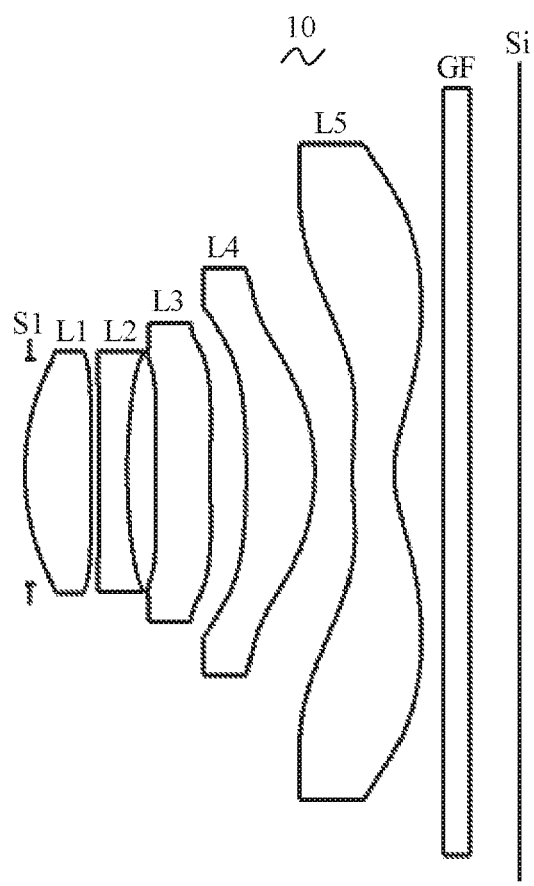
FIG. 1 is a schematic diagram of a structure of a camera optical lens according to Embodiment 1 of the present disclosure.

Referring to FIGS. 1-4, the present disclosure provides a camera optical lens 10 of Embodiment 1 of the present disclosure. In FIG. 1, the left side is an object side and the right side is an image side. The camera optical lens 10 includes five lenses, and specifically includes, from the object side to the image side: an aperture S1, a first lens L1, a second lens L2, a third lens L3, a fourth lens L4 and a fifth lens L5. A glass plate GF is provided between the fifth lens L5 and an image surface Si. The glass plate GF may be a glass cover plate or an optical filter.

In an embodiment, the first lens L1 has a positive refractive power; the second lens L2 has a negative refractive power; the third lens L3 has a positive refractive power; the fourth lens L4 has a positive refractive power; the fifth lens L5 has a negative refractive power.

Here, a curvature radius of the object-side surface of the third lens L3 is defined as R5, a curvature radius of the image-side surface of the third lens L3 is defined as R6, a focal length of the entire camera optical lens 10 is defined as f, a focal length of the first lens L1 is defined as f1, an on-axis thickness of the second lens L2 is defines as d3, an on-axis distance from the image-side surface of the second lens L2 to the object-side surface of the third lens L3 is defined as d4, an on-axis thickness of the fourth lens L4 is defined as d7, an on-axis distance from the image-side surface of the fourth lens L4 to the object-side surface of the fifth lens L5 is defined as d8, a curvature radius of the image-side surface of the second lens L2 is defined as R4, and the camera optical lens 10 satisfies the following conditions:

$$0.50 \leq R5/R6 \leq 0.75 \tag{1}$$

$$0.80 \leq f1/f \leq 1.00 \tag{2}$$

$$0.80 \leq d3/d4 \leq 1.15 \tag{3}$$

$$1.65 \leq d7/d8 \leq 2.50 \tag{4}$$

$$0.00 \leq R4 \tag{5}$$

The condition (1) specifies a shape of the third lens L3. Within this range, the aberration can be effectively reduced, and the imaging quality can be improved.

The condition (2) specifies a range of a ratio of the focal length of the first lens to the focal length of the entire camera optical lens. Within this range, the imaging quality can be improved.

The condition (3) specifies a range of d3/d4, within which ultra-thin lenses can be achieved.

The condition (4) specifies a range of d7/d8, within which processing and assembly of the lenses can be facilitated.

The conditional expression (5) specifies that the curvature radius of the image-side surface of the second lens L2 is greater than or equal to 0. Within the range, the aberration correction can be facilitated.

A curvature radius of the object-side surface of the fifth lens L5 is defined as R9, a curvature radius of the image-side surface of the fifth lens L5 is defined as R10, and the camera optical lens 10 further satisfies a condition of 2.00≤R9/R10≤5.00, which specifies a shape of the fifth lens L5. Within this range, the field curvature correction can be facilitated, and the imaging quality can be improved.

In an embodiment, the object-side surface of the first lens L1 is convex in a paraxial region, and the image-side surface of the first lens L1 is concave in the paraxial region.

A curvature radius of an object-side surface of the first lens L1 is defined as R1, a curvature radius of an image-side surface of the first lens L1 is defined as R2, and the camera optical lens 10 further satisfies a condition of −3.29≤(R1+R2)/(R1−R2)≤−0.77. This can reasonably control a shape of the first lens L1 in such a manner that the first lens L1 can effectively correct a spherical aberration of the camera optical lens. Preferably, the camera optical lens 10 thither satisfies a condition of −2.06≤(R1+R2)/(R1−R2)≤−0.97.

An on-axis thickness of the first lens L1 is defined as d1, a total optical length from the object side surface of the first lens L1 to an image surface Si of the camera. optical lens along an optical axis is defined as TTL, and the camera optical lens 10 further satisfies a condition of 0.06≤d1/TTL≤0.24. This can facilitate achieving ultra-thin lenses. Preferably, the camera optical lens 10 further satisfies a condition of 0.10≤d1/TTL≤0.19.

In an embodiment, an object-side surface of the second lens L2 is convex in the proximal region, and an image-side surface of the second lens L2 is concave in the proximal region.

A focal length of the second lens L2 is defined as f2. The camera optical lens 10 further satisfies a condition of −9.10≤f2/f≤−1.09. By controlling a negative power of the second lens L2 within a reasonable range, correction of the aberration of the optical system can be facilitated. Preferably, the camera optical lens 10 further satisfies a condition of −5.69≤f2/f≤−1.37.

A curvature radius of the object-side surface of the second lens L2. is defined as R3, a curvature radius of the image-side surface of the second lens L2 is defined as R4, and the camera optical lens 10 further satisfies a condition of −2.00≤(R3+R4)/(R3−R4)≤1.62, which specifies a shape of the second lens L2. Within this range, a development towards ultra-thin and wide-angle lenses would facilitate correcting the problem of an axis aberration. Preferably, the camera optical lens 10 further satisfies a condition of −1.25≤(R3+R4)/(R3−R4)≤1.29.

An on-axis thickness of the second lens L2 is defines as d3, and the camera optical lens 10 further satisfies a condition of 0.03≤d3/TTL≤0.09. This can facilitate achieving ultra-thin lenses. Preferably, the camera optical lens 10 further satisfies a condition of 0.05≤d3/TTL≤0.07.

In an embodiment, an object-side surface of the third lens L3 is convex in the proximal region, and an image-side surface of the third lens L3 is concave in the proximal region.

A focal length of the third lens L3 is defined as f3, and the camera optical lens 10 further satisfies a condition of −192.44≤f3/f≤13.80. An appropriate distribution of the negative power leads to a better imaging quality and a lower sensitivity. Preferably, the camera optical lens 10 further satisfies a condition of −120.28≤f3/f≤11.04.

A curvature radius of the object-side surface of the third lens L3 is defined as R5, a curvature radius of the image-side surface of the third lens L3 is defined as R6,and the camera optical lens 10 further satisfies a condition of −13.44≤(R5+R6)/(R5−R6)−2.01. This can effectively control a shape of the third lens L3, thereby facilitating shaping of the third lens. Within this range, a deflection degree of the light passing through the lens can be alleviated to effectively reduce the aberration. Preferably, the camera optical lens 10 further satisfies a condition of −8.40≤(R5+R6)/(R5−R6)≤−2.51.

An on-axis thickness of the third lens L3 is defined as d5, and the camera. optical lens 10 further satisfies a condition of 0.04≤d5/TTL≤0.17. This can facilitate achieving ultra-thin lenses. Preferably, the camera optical lens 10 further satisfies a condition of 0.06≤d5/TTL≤0.13.

In an embodiment, an object-side surface of the fourth lens L4 is concave in the proximal region, and an image-side surface of the fourth lens L4 is convex in the proximal region.

A focal length of the fourth lens L4 is defined as f4, and the camera optical lens 10 further satisfies a condition of 0.44≤f4/f≤1.66. The appropriate distribution of positive refractive power makes it possible that the system has the better imaging quality and the lower sensitivity. Preferably, the camera optical lens 10 further satisfies a condition of 0.71≤f4/f≤1.33.

A curvature radius of the object-side surface of the fourth lens L4 is defined as R7, a curvature radius of the image-side surface of the fourth lens L4 is defined as R8, and the camera optical lens 10 further satisfies a condition of 0.27≤(R7+R8)/(R7−R8)≤2.53, which specifies a shape of the fourth lens L4. Within this range, a development towards ultra-thin and wide-angle lens would facilitate correcting a problem like an off-axis aberration. Preferably, the camera optical lens 10 further satisfies a condition of 0.43≤(R7+R8)/(R7−R8)≤2.02.

An on-axis thickness of the fourth lens L4 is defined as d7, and the camera optical lens 10 further satisfies a condition of 0.07≤d7/1TTL≤0.25. This can facilitate achieving ultra-thin lenses. Preferably, the camera optical lens 10 further satisfies a condition of 0.11≤d7/TTL≤0.20.

In an embodiment, an object-side surface of the fifth lens L5 is convex in the proximal region, and an image-side surface of the fifth lens L5 is concave in the proximal region.

A focal length of the fifth lens L5 is defined as f5, and the camera optical lens 10 further satisfies a condition of −1.65≤f5−0.44, which can effectively make a light angle of the camera lens gentle and reduce a tolerance sensitivity. Preferably, the camera optical lens 10 further satisfies a condition of −1.03≤f5/f≤−0.55.

A curvature radius of the object-side surface of the fifth lens L5 is defined as R9, a curvature radius of the image-side surface of the fifth lens L5 is defined as R10, and the camera optical lens 10 further satisfies a condition of 0.75≤(R9+

R10)/(R9−R10)≤4.22, which specifies a shape of the fifth lens L5. Within this range, a development towards ultra-thin and wide-angle lens would facilitate correcting a problem like an off-axis aberration. Preferably, the camera optical lens 10 further satisfies a condition of 1.21≤(R9+R10)/(R9−R10)≤3.38.

An on-axis thickness of the fifth lens L5 is defined as d9, and the camera optical lens 10 further satisfies a condition of 0.04≤d9/TTL≤0.13. This can facilitate achieving ultra-thin lenses. Preferably, the camera optical lens 10 further satisfies a condition of 0.06≤d9/TTL≤0.10.

In an embodiment, an image height of the entire camera optical lens 10 is defined as IH, and the camera optical lens 10 further satisfies a condition of TTL/IH≤1.52, so as to achieve ultra-thin lenses.

In an embodiment, a field of view of the camera optical lens is defined as FOV, and the camera optical lens 10 further satisfies a condition of FOV≥77.00°, so as to achieve wide-angle lenses.

In an embodiment, an F number Fno of the camera optical lens 10 is less than or equal to 2.05, such that the camera optical lens 10 has a large aperture and a better imaging performance.

In an embodiment, a combined focal length of the first lens L1 and the second lens L2 is defined as f12, and the camera optical lens 10 further satisfies a condition of 0.47≤f12/f≤2.25. Within this range, the aberration and distortion of the camera optical lens 10 can be eliminated, and a back focal length of the camera optical lens 10 can be suppressed to maintain the miniaturization of the image lens system. Preferably, the camera optical lens 10 further satisfies a condition of 0.75≤f12/f≤1.80.

In addition, in the camera optical lens 10 provided in an embodiment, the surface of each lens may be aspherical. The aspherical surface can be easily made into a shape other than a spherical surface, and more control variables can be obtained to reduce aberration and thus to reduce the number of lenses, so that the total length of the camera optical lens 10 can be effectively reduced. In an embodiment, both the object-side surface and the image-side surface of each lens are aspherical.

It should be appreciated that since the first lens L1, the second lens L2, the third lens L3, the fourth lens L4, and the fifth lens L5 have the aforementioned structure and parameter relationships, the optical powers, intervals, and shapes of the respective lenses in the camera optical lens 10 can be reasonably distributed, and thus various types of aberrations are corrected.

In addition, inflexion points and/or arrest points can be arranged on at least one of the object-side surface and the image-side surface of each lens, so as to satisfy the demand for high quality imaging. The description below can be referred for specific implementations.

The design data of the camera optical lens 10 in Embodiment 1 of the present disclosure are shown as follows.

Table 1 shows the curvature radiuses of the object-side surfaces and the image-side surfaces, the on-axis thicknesses, the on-axis distances d between adjacent lenses, the refractive indexes nd and the abbe number vd of the first to fifth lenses (L1 to L5) constituting the camera optical lens 10 in Embodiment 1 of the present disclosure. It should be noted that the focal length, on-axis distance, curvature radius, on-axis thickness, inflexion point position, and arrest point position are all in units of mm.

TTL: Optical length (the total optical length from the object side surface of the first lens to the image surface of the camera optical lens along the optical axis) in mm.

TABLE 1

|  | R | d | nd |  | vd |  |
|---|---|---|---|---|---|---|
| S1 | ∞ | d0 = −0.042 |  |  |  |  |
| R1 | 1.368 | d1 = 0.516 | nd1 | 1.5438 | v1 | 56.03 |
| R2 | 18.672 | d2 = 0.066 |  |  |  |  |
| R3 | 86.370 | d3 = 0.222 | nd2 | 1.6610 | v2 | 20.53 |
| R4 | 3.238 | d4 = 0.216 |  |  |  |  |
| R5 | 5.768 | d5 = 0.433 | nd3 | 1.5438 | v3 | 56.03 |
| R6 | 8.972 | d6 = 0.286 |  |  |  |  |
| R7 | −4.852 | d7 = 0.534 | nd4 | 1.5346 | v4 | 55.69 |
| R8 | −1.161 | d8 = 0.295 |  |  |  |  |
| R9 | 1.959 | d9 = 0.332 | nd5 | 1.5346 | v5 | 55.69 |
| R10 | 0.733 | d10 = 0.382 |  |  |  |  |
| R11 | ∞ | d11 = 0.210 | ndg | 1.5168 | vg | 64.17 |
| R12 | ∞ | d12 = 0.391 |  |  |  |  |

In the table, meanings of various symbols will be described as follows.

S1: aperture;

R: curvature radius of an optical surface, a central curvature radius for a lens;

R1: curvature radius of the object-side surface of the first lens L1;

R2: curvature radius of the image-side surface of the first lens L1;

R3: curvature radius of the object-side surface of the second lens L2;

R4: curvature radius of the image-side surface of the second lens L2;

R5: curvature radius of the object-side surface of the third lens L3;

R6: curvature radius of the image-side surface of the third lens L3;

R7: curvature radius of the object-side surface of the fourth lens L4;

R8: curvature radius of the image-side surface of the fourth lens L4;

R9: curvature radius of the object-side surface of the fifth lens L5;

R10: curvature radius of the image-side surface of the fifth lens L5;

R11: curvature radius of an object-side surface of the optical filter GF;

R12: curvature radius of an image-side surface of the optical filter GF;

d: on-axis thickness of a lens and an on-axis distance between lens;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the optical filter GF;

d11: on-axis thickness of the optical filter GF;
d12: on-axis distance from the image-side surface to the image surface of the optical filter GF;
nd: refractive index of the d line;
nd1: refractive index of the d line of the first lens L1;
nd2: refractive index of the d line of the second lens L2;
nd3: refractive index of the d line of the third lens L3;
nd4: refractive index of the d line of the fourth lens L4;
nd5: refractive index of the d line of the fifth lens L5;
ndg: refractive index of the d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
vg: abbe number of the optical filter GF.

Table 2 shows aspherical surface data of the camera optical lens 10 in Embodiment 1 of the present disclosure.

TABLE 2

| | Conic coefficient | Aspheric surface coefficients | | | |
|---|---|---|---|---|---|
| | k | A4 | A6 | A8 | A10 |
| R1 | −1.7586E−01 | −3.1117E−02 | 8.9672E−01 | −9.6753E+00 | 5.3995E+01 |
| R2 | 3.8516E+01 | −1.7897E−01 | 7.9642E−01 | −5.1654E+00 | 2.4786E+01 |
| R3 | 9.3598E+01 | −2.1693E−01 | 8.1005E−01 | −2.7412E−02 | −9.1220E+00 |
| R4 | 1.1167E+01 | −2.0887E−01 | 9.3117E−01 | −3.2792E+00 | 1.6564E+01 |
| R5 | −1.2762E+01 | −3.6379E−01 | 1.4111E+00 | −1.2929E+01 | 7.4409E+01 |
| R6 | −9.7648E+01 | −2.0504E−01 | 3.3605E−01 | −3.9348E+00 | 1.9589E+01 |
| R7 | 1.2447E+01 | 3.6615E−02 | −8.3310E−01 | 3.4500E+00 | −1.3536E+01 |
| RS | −1.5347E+00 | −3.4859E−02 | −5.5464E−02 | 1.9452E−01 | −1.0365E+00 |
| R9 | −3.7613E+01 | −5.4775E−01 | 3.2667E−01 | 7.7335E−02 | −2.1367E−01 |
| R10 | −4.6127E+00 | −3.4555E−01 | 3.5519E−01 | −2.5945E−01 | 1.3424E−01 |

| | Aspheric surface coefficients | | | | |
|---|---|---|---|---|---|
| | A12 | A14 | A16 | A18 | A20 |
| R1 | −1.7572E+02 | 3.4080E+02 | −3.8436E+02 | 2.2738E+02 | −5.2546E+01 |
| R2 | −8.1338E+01 | 1.5554E+02 | −1.5416E+02 | 5.7276E+01 | 5.2691E+00 |
| R3 | 2.9518E+01 | −4.9135E+01 | 5.9893E+01 | −5.6334E+01 | 2.7019E+01 |
| R4 | −7.7916E+01 | 2.2423E+02 | −3.6595E+02 | 3.1621E+02 | −1.1188E+02 |
| R5 | −2.6665E+02 | 5.9423E+02 | −8.1253E+02 | 6.2632E+02 | −2.0599E+02 |
| R6 | −5.6427E+01 | 9.8802E+01 | −1.0509E+02 | 6.2566E+01 | −1.5824E+01 |
| R7 | 3.5039E+01 | −5.4209E+01 | 4.8295E+01 | −2.2735E+01 | 4.3608E+00 |
| RS | 2.3877E+00 | −2.4786E+00 | 1.3291E+00 | −3.6636E−01 | 4.1590E−02 |
| R9 | 1.3343E−01 | −4.2995E−02 | 7.6080E−03 | −6.7684E−04 | 2.1816E−05 |
| R10 | −4.9058E−02 | 1.2310E−02 | −2.0134E−03 | 1.9301E−04 | −8.1927E−06 |

In table 2, K is a conic coefficient, and A4, A6, A8, A10, A12, A14, A16, A18 and A20 are aspheric surface coefficients.

IH: Image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (1)$$

For convenience, an aspheric surface of each lens surface uses the aspheric surfaces shown in the above formula (1). However, the present disclosure is not limited to the aspherical polynomials form shown in the formula (1).

Table 3 and Table 4 show design data of inflexion points and arrest points of each lens of the camera optical lens 10 according to the present embodiment. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

TABLE 3

| | Number(s) of inflexion points | Inflexion point position 1 | Inflexion point position 2 | Inflexion point position 3 |
|---|---|---|---|---|
| P1R1 | 1 | 0.715 | | |
| P1R2 | 2 | 0.185 | 0.795 | |
| P2R1 | 2 | 0.075 | 0.655 | |
| P2R2 | 0 | | | |
| P3R1 | 2 | 0.225 | 0.735 | |

TABLE 3-continued

| | Number(s) of inflexion points | Inflexion point position 1 | Inflexion point position 2 | Inflexion point position 3 |
|---|---|---|---|---|
| P3R2 | 2 | 0.215 | 0.865 | |
| P4R1 | 2 | 0.945 | 1.005 | |
| P4R2 | 3 | 0.845 | 1.205 | 1.345 |
| P5R1 | 2 | 0.225 | 1.105 | |
| P5R2 | 3 | 0.405 | 2.045 | 2.135 |

TABLE 4

| | Number(s) of arrest points | Arrest point position 1 | Arrest point position 2 |
|---|---|---|---|
| P1R1 | 0 | | |
| P1R2 | 1 | 0.335 | |
| P2R1 | 2 | 0.125 | 0.745 |
| P2R2 | 0 | | |
| P3R1 | 2 | 0.385 | 0.805 |

TABLE 4-continued

| | Number(s) of arrest points | Arrest point position 1 | Arrest point position 2 |
|---|---|---|---|
| P3R2 | 2 | 0.355 | 0.975 |
| P4R1 | 0 | | |
| P4R2 | 0 | | |
| P5R1 | 1 | 0.415 | |
| P5R2 | 1 | 1.115 | |

In addition, in the subsequent Table 13, various parameters of Embodiments 1 and values corresponding to the parameters specified in the above conditions are shown.

Figure 2:
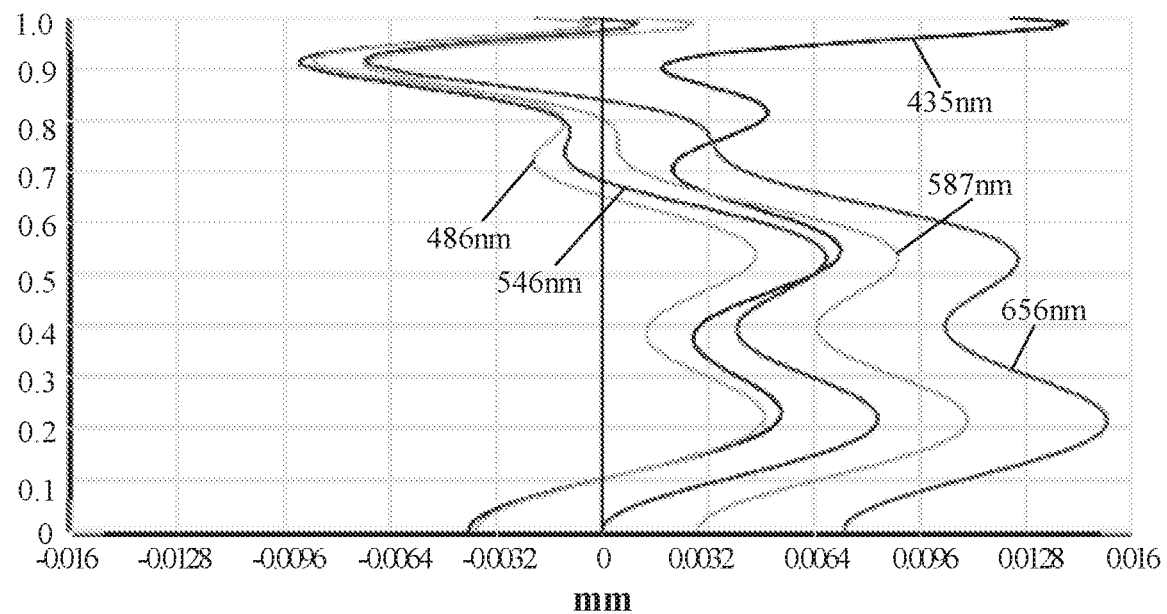
FIG. 2 is a schematic diagram of a longitudinal aberration of the camera optical lens shown in FIG. 1.
Figure 3:
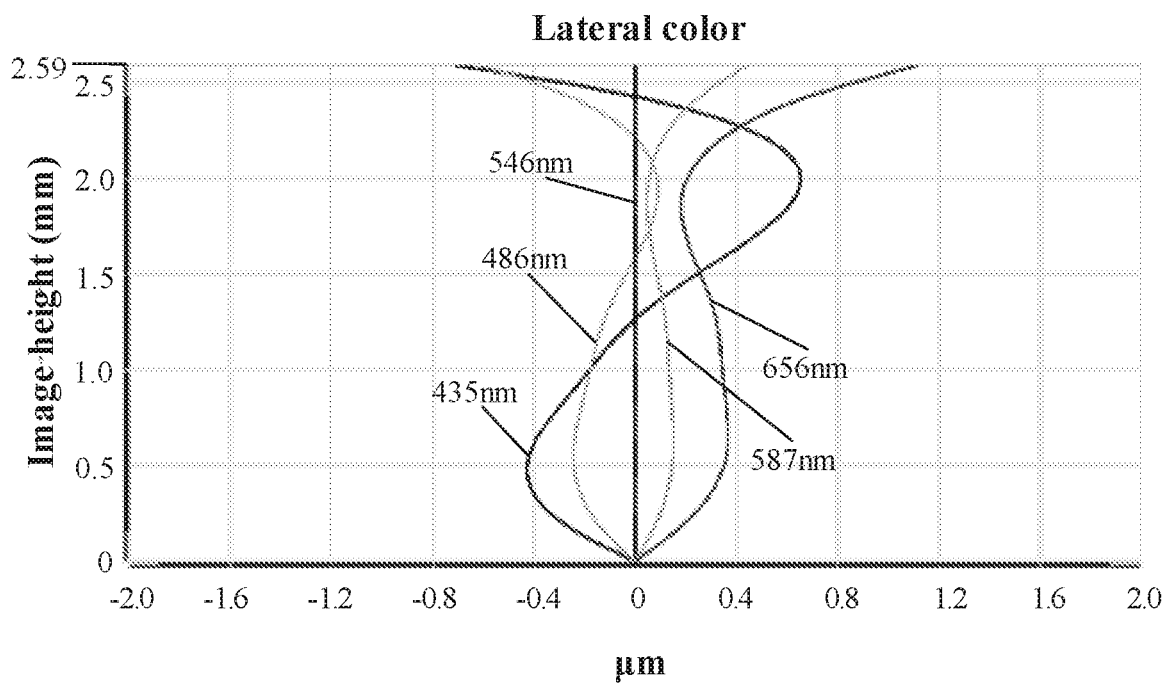
FIG. 3 is a schematic diagram of a lateral color of the camera optical lens shown in FIG. 1.
Figure 4:
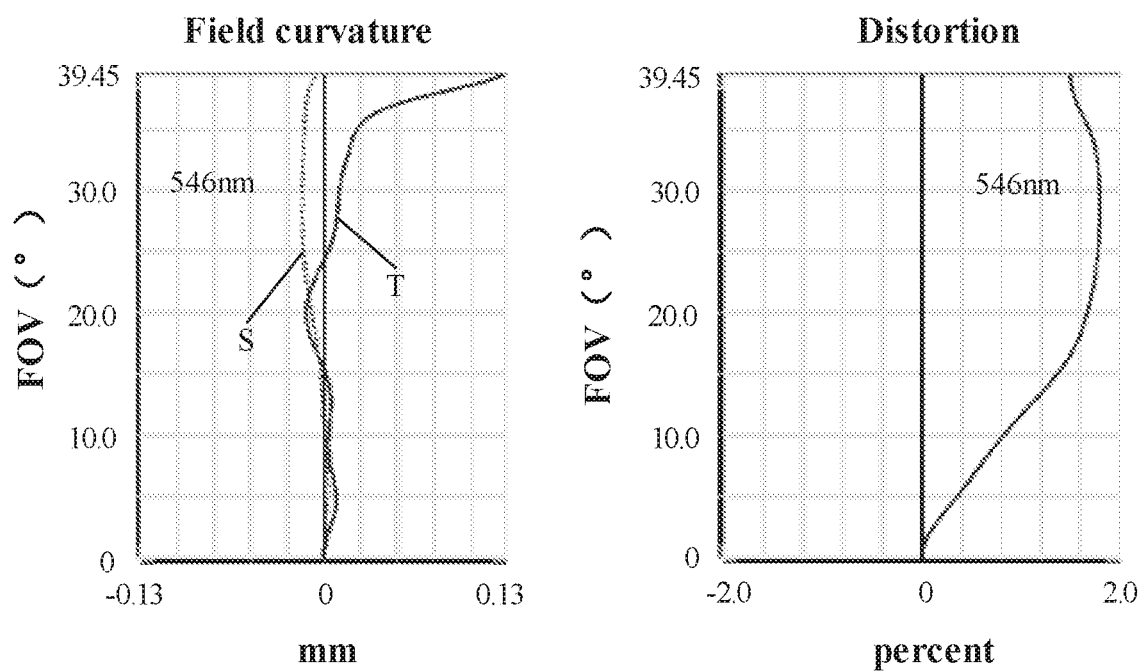
FIG. 4 is a schematic diagram of a field curvature and a distortion of the camera optical lens shown in FIG 1.

FIG. 2 and FIG. 3 illustrate a longitudinal aberration and a lateral color with wavelengths of 486 nm, 546 nm, 435 nm, 587 nm and 656 nm after passing the camera optical lens 10, respectively. FIG. 4 illustrates a field curvature and a distortion with a wavelength of 546 nm after passing the camera optical lens 10. A field curvature S in FIG. 4 is a field curvature in a sagittal direction, and T is a field curvature in a tangential direction.

In this Embodiment, an entrance pupil diameter of the camera optical lens 10 is 1.504 mm, an image height of 1.0H is 2.59 mm, and an FOV (field of view) in a diagonal direction is 78.90°. Thus, the camera optical lens 10 has a large aperture, and is wide-angle and ultra-thin, thereby achieving excellent optical characteristics.

Embodiment 2

Figure 5:
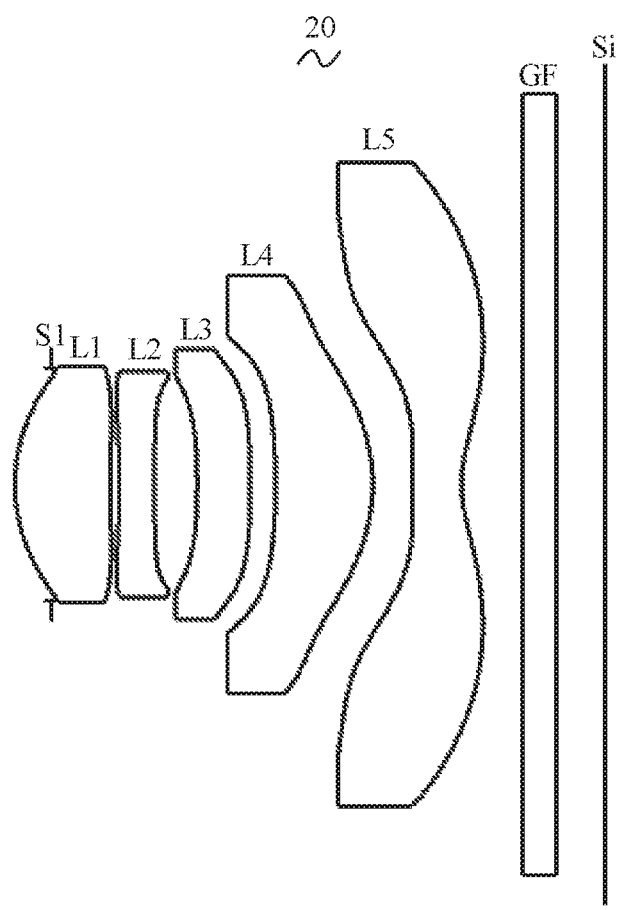
FIG. 5 is a schematic diagram of a structure of a camera optical lens according to Embodiment 2 of the present disclosure.

FIG. 5 is a schematic diagram of a structure of a camera optical lens 20 according to Embodiment 2. Embodiment 2 is basically the same as Embodiment 1 and involves symbols having the same meanings as Embodiment 1, and only differences therebetween will be described in the following, An object-side surface of the second lens L2 is concave in the proximal region, an object-side surface of the third lens L3 is concave in the proximal region, and an image-side surface of the third lens L3 is convex in the proximal region.

Table 5 and Table 6 show design data of a camera optical lens 20 in Embodiment 2 of the present disclosure.

TABLE 5

| | R | d | nd | vd |
|---|---|---|---|---|
| S1 | ∞ | d0 = −0.225 | | |
| R1 | 1.159 | d1 = 0.599 | nd1 1.5438 | v1 56.03 |
| R2 | 5.852 | d2 = 0.056 | | |
| R3 | −9.509 | d3 = 0.222 | nd2 1.6610 | v2 20.53 |
| R4 | 10000000.000 | d4 = 0.267 | | |
| R5 | −4.557 | d5 = 0.332 | nd3 1.5438 | v3 56.03 |
| R6 | −9.096 | d6 = 0.159 | | |
| R7 | −4.798 | d7 = 0.611 | nd4 1.5346 | v4 55.69 |
| R8 | −1.223 | d8 = 0.246 | | |

Table 6 shows aspherical surface data of each lens of the camera optical lens 20 in Embodiment 2 of the present disclosure.

TABLE 6

| | Conic coefficient | Aspheric surface coefficients | | | |
|---|---|---|---|---|---|
| | k | A4 | A6 | A8 | A10 |
| R1 | −2.1390E−01 | −2.4132E−02 | 5.0154E−01 | −4.9353E+00 | 2.8823E+01 |
| R2 | −8.2295E+01 | −1.9571E−01 | −4.9641E−02 | −1.1460E+00 | 1.2993E+01 |
| R3 | 1.5881E+02 | −1.2937E−01 | 6.5106E−01 | −2.8466E+00 | 2.5268E+01 |
| R4 | 2.8585E+01 | 1.3243E−01 | −1.1124E+00 | 2.1453E+01 | −1.6448E+02 |
| R5 | 3.4845E+01 | −1.3663E−01 | −2.2034E+00 | 2.2497E+01 | −1.4673E+02 |
| R6 | 7.4089E+00 | −1.2144E−01 | −9.4551E−01 | 1.8218E+00 | 5.7132E+00 |
| R7 | 1.6330E+01 | 1.2143E−01 | −1.4780B+00 | 5.3797E+00 | −1.5711E+01 |
| R8 | −1.8087E+00 | −1.3671E−02 | −8.5861E−02 | 1.8271E−01 | −3.7494E−01 |
| R9 | −2.1688E+02 | −9.2424E−01 | 1.3315E+00 | −1.4436E+00 | 1.2640E+00 |
| R10 | −7.3509E+00 | −3.8807E−01 | 4.9005E−01 | −4.3898E−01 | 2.7288E−01 |

| | Aspheric surface coefficients | | | | |
|---|---|---|---|---|---|
| | A12 | A14 | A16 | A18 | A20 |
| R1 | −1.0729E+02 | 2.5173E+02 | −3.6241E+02 | 2.9114E+02 | −1.0025E+02 |
| R2 | −5.8953E+01 | 1.5486E+02 | −2.5021E+02 | 2.3017E+02 | −9.2402E+01 |
| R3 | −1.2035E+02 | 3.3189E+02 | −5.3708E+02 | 4.7492E+02 | −1.7552E+02 |
| R4 | 7.9067E+02 | −2.4077E+03 | 4.4960E+03 | −4.6827E+03 | 2.0917E+03 |
| R5 | 6.3978E+02 | −1.8352E+03 | 3.2999E+03 | −3.3712E+03 | 1.5063E+03 |
| R6 | −4.3862E+01 | 1.1740E+02 | −1.6656E+02 | 1.2394E+02 | −3.7534E+01 |
| R7 | 3.4437E+01 | −5.1978E+01 | 4.9298E+01 | −2.6369E+01 | 6.1189E+00 |
| R8 | 9.3328E−01 | −1.1514E+00 | 7.0812E−01 | −2.1639E−01 | 2.6434E−02 |
| R9 | −7.6976E−01 | 3.0140E−01 | −7.2181E−02 | 9.6325E−03 | −5.4940E−04 |
| R10 | −1.1632E−01 | 3.3067E−02 | −5.9516E−03 | 6.1049E−04 | −2.7101E−05 |

Table 7 and table 8 show design data of inflexion points and arrest points of each lens of the camera optical lens 20.

TABLE 7

| | Number(s) of inflexion points | Inflexion point position 1 | Inflexion point position 2 | Inflexion point position 3 |
|---|---|---|---|---|
| P1R1 | 1 | | | |
| P1R2 | 1 | 0.245 | | |
| P2R1 | 2 | 0.415 | 0.725 | |
| P2R2 | 0 | | | |
| P3R1 | 1 | 0.675 | | |
| P3R2 | 1 | 0.815 | | |
| P4R1 | 1 | 0.955 | | |
| P4R2 | 2 | 0.815 | 1.135 | |
| P5R1 | 3 | 0.135 | 0.935 | 1.795 |
| P5R2 | 1 | 0.355 | | |

TABLE 8

| | Number of arrest points | Arrest point position 1 |
|---|---|---|
| P1R1 | 0 | |
| P1R2 | 1 | 0.415 |
| P2R1 | 1 | 0.575 |
| P2R2 | 0 | |
| P3R1 | 0 | |
| P3R2 | 0 | |
| P4R1 | 0 | |
| P4R2 | 0 | |
| P5R1 | 1 | 0.235 |
| P5R2 | 1 | 0.935 |

In addition, in the subsequent Table 13, various parameters of Embodiments 2 and values corresponding to the parameters specified in the above conditions are shown.

Figure 6:
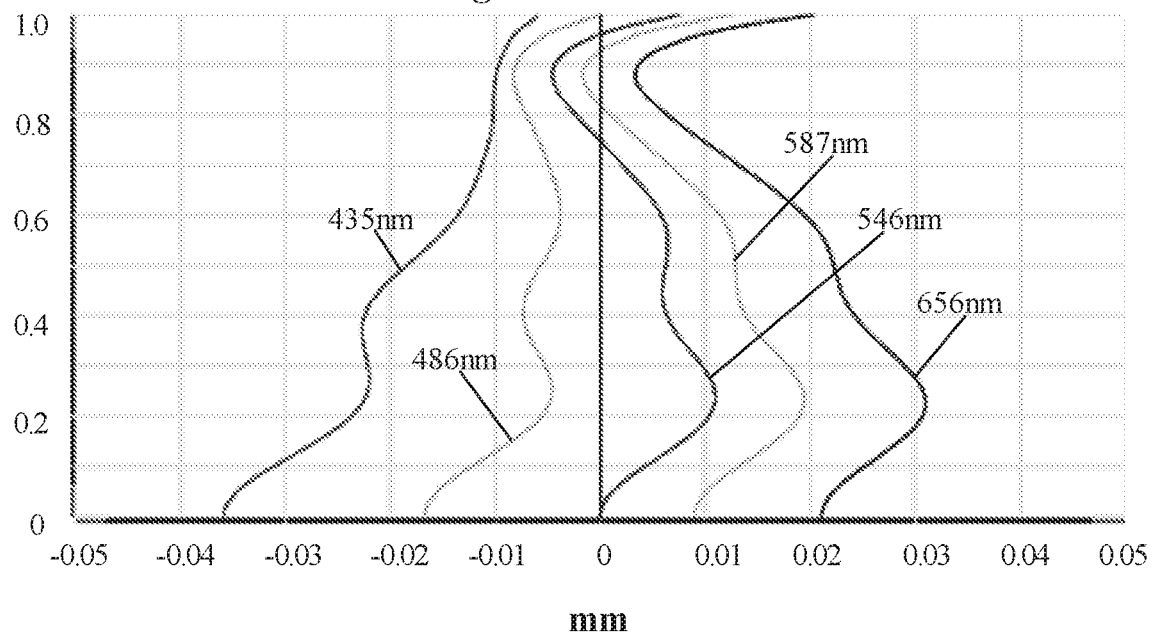
FIG. 6 is a schematic diagram of a longitudinal aberration of the camera optical lens shown in FIG. 5.
Figure 7:
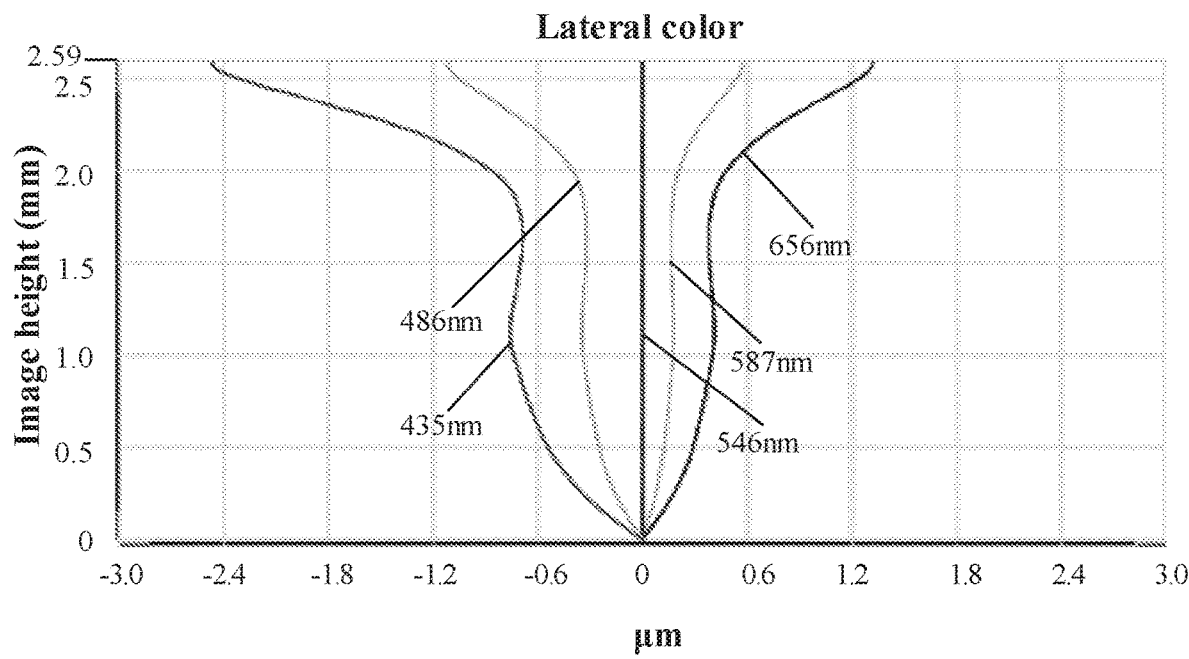
FIG. 7 is a schematic diagram of a lateral color of the camera optical lens shown in FIG. 5.
Figure 8:
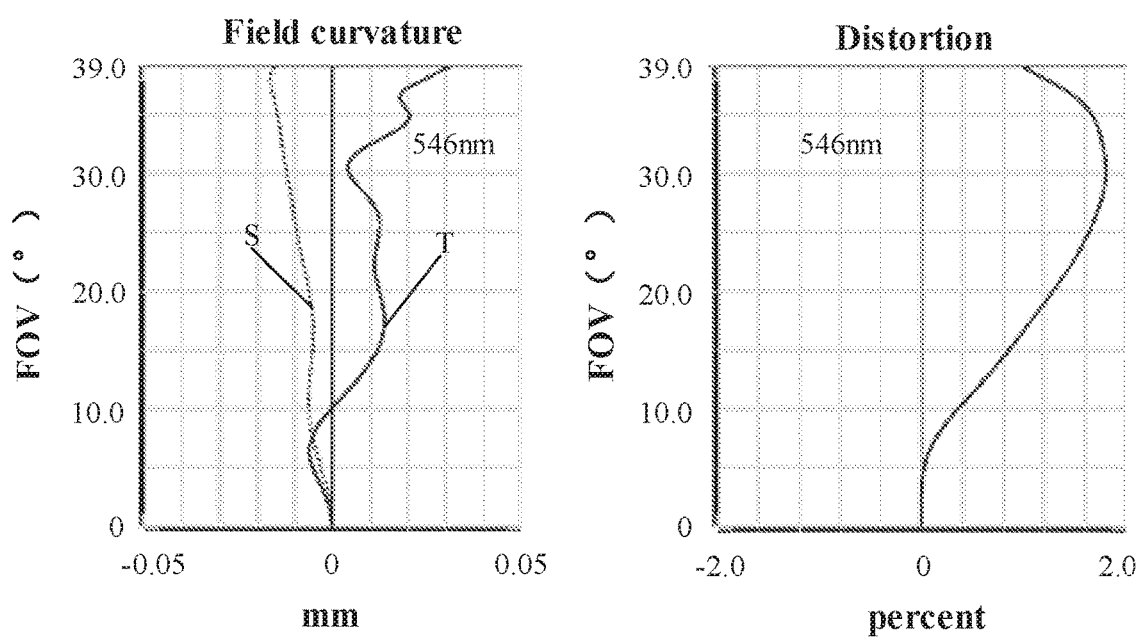
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 435 nm, 486 nm, 587 nm, 546 nm and 656 nm after passing the camera optical lens 20. FIG. 8 illustrates a field curvature and a distortion of light with a wavelength of 546 nm after passing the camera optical lens 20. A field curvature S in FIG. 8 is a field curvature in a sagittal direction, and T is a field curvature in a tangential direction.

In an embodiment, an entrance pupil diameter of the camera optical lens 20 is 1.532 mm, an image height of 1.0H is 2.59 mm, and an FOV (field of view) in the diagonal direction is 78.00°. Thus, the camera optical lens 20 has a large aperture, and is wide-angle and ultra-thin, thereby achieving excellent optical characteristics.

Embodiment 3

Figure 9:
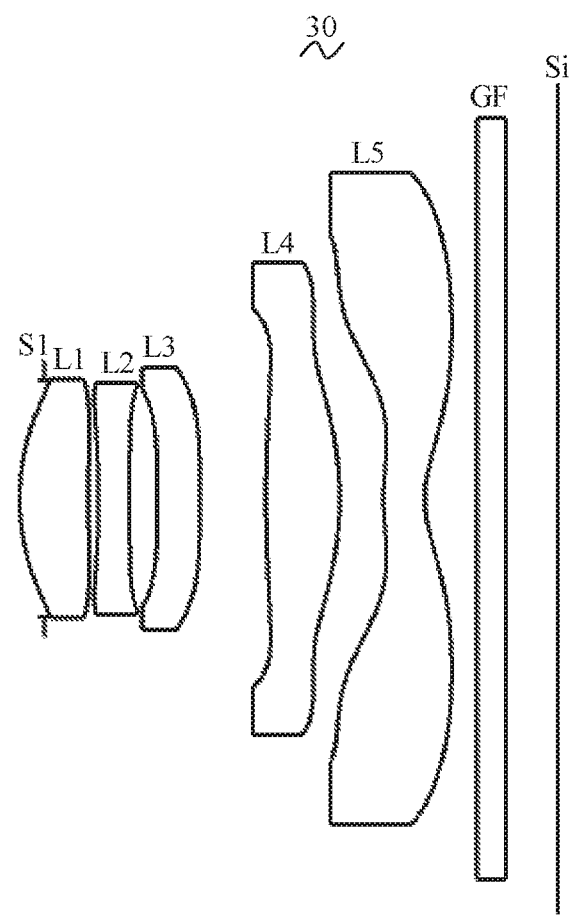
FIG. 9 is a schematic diagram of a structure of a camera optical lens according to Embodiment 3 of the present disclosure.

FIG. 9 is a schematic diagram of a structure of a camera optical lens 30 according to Embodiment 3. Embodiment 3 is basically the same as Embodiment 1 and involves symbols having the same meanings as Embodiment 1, and only differences therebetween will be described in the following.

An object-side surface of the second lens L2 is concave in the proximal region, an object-side surface of the third lens L3 is concave in the proximal region, an image-side surface of the third lens L3 is convex in the proximal region, and an object-side surface of the forth lens L4 is convex in the proximal region.

Table 9 and Table 10 show design data of a camera optical lens 30 in Embodiment 3 of the present disclosure.

TABLE 9

| | R | d | nd | vd |
|---|---|---|---|---|
| S1 | ∞ | d0 = −0.178 | | |
| R1 | 1.345 | d1 = 0.500 | nd1 1.5438 | v1 56.03 |
| R2 | 5.517 | d2 = 0.074 | | |
| R3 | −7.344 | d3 = 0.227 | nd2 1.6610 | v2 20.53 |
| R4 | 99990000000.000 | d4 = 0.201 | | |
| R5 | −43.115 | d5 = 0.308 | nd3 1.5438 | v3 56.03 |
| R6 | −58.190 | d6 = 0.482 | | |
| R7 | 8.004 | d7 = 0.533 | nd4 1.5346 | v4 55.69 |
| R8 | −2.426 | d8 = 0.321 | | |
| R9 | 1.322 | d9 = 0.299 | nd5 1.5346 | v5 55.69 |
| R10 | 0.629 | d10 = 0.382 | | |
| R11 | ∞ | d11 = 0.210 | ndg 1.5168 | vg 64.17 |
| R12 | ∞ | d12 = 0.374 | | |

Table 10 shows aspherical surface data of each lens of the camera optical lens 30 in Embodiment 3 of the present disclosure.

TABLE 10

| | Conic coefficient | Aspheric surface coefficients | | | |
|---|---|---|---|---|---|
| | k | A4 | A6 | A8 | A10 |
| R1 | −2.4887E−01 | −4.6458E−03 | 2.4889E−02 | −6.4798E−01 | 4.7990E+00 |
| R2 | −6.4276E+01 | −2.2775E−01 | 1.4080E−01 | −1.0628E+00 | 8.5417E+00 |
| R3 | 8.4602E+01 | −1.9285E−01 | 7.0176E−01 | −3.3237E−01 | 5.7333E−01 |
| R4 | 2.6486E+01 | −4.0797E−02 | 1.5997E−01 | 6.9529E+00 | −5.7968E+01 |
| R5 | −9.9000E+01 | −3.5945E−01 | −5.0228E−02 | 9.5003E+00 | −8.0397E+01 |
| R6 | −9.9000E+01 | −2.9125E−01 | −7.1578E−02 | 1.7750E+00 | −1.1856E+01 |
| R7 | 3.6432E+01 | −4.3379E−02 | 8.7542E−02 | −5.8584E−01 | 1.8504E+00 |
| R8 | −1.7052E+00 | −2.6973E−01 | 9.8246E−01 | −2.1840E+00 | 3.3358E+00 |
| R9 | −2.0316E+01 | −1.0589E+00 | 1.3650E+00 | −1.1158E+00 | 6.3264E−01 |
| R10 | −5.3744E+00 | −4.3037E−01 | 5.2966E−01 | −4.2738E−01 | 2.3652E−01 |

| | Aspheric surface coefficients | | | | |
|---|---|---|---|---|---|
| | A12 | A14 | A16 | A18 | A20 |
| R1 | −2.1603E+01 | 5.6958E+01 | −8.9009E+01 | 7.5272E+01 | −2.6641E+01 |
| R2 | −3.5183E+01 | 8.6277E+01 | −1.3452E+02 | 1.2456E+02 | −5.1646E+01 |
| R3 | −3.2432E+00 | 2.3052E+00 | 1.1034E+01 | −1.8555E+01 | 8.7395E+00 |
| R4 | 2.8113E+02 | −8.7323E+02 | 1.6783E+03 | −1.8136E+03 | 8.4714E+02 |
| R5 | 4.0524E+02 | −1 2845E+03 | 2.4853E+03 | −2.6888E+03 | 1.2529E+03 |
| R6 | 4.1884E+01 | −8.9450E+01 | 1.1501E+02 | −8.2326E+01 | 2.5583E+01 |
| R7 | −3.1974E+00 | 3.2648E+00 | −2.0082E+00 | 6.8441E−01 | −9.8700E−02 |
| R8 | −3.0928E+00 | 1.7174E+00 | −5.6266E−01 | 1.0070E−01 | −7.6160E−03 |
| R9 | −1.9953E−01 | 9.2418E−03 | 1.4565E−02 | −4.2957E−03 | 3.8698E−04 |
| R10 | −8.9764E−02 | 2.2755E−02 | −3.6583E−03 | 3.3573E−04 | −1.3360E−05 |

Table 11 and Table 12 show design data inflexion points and arrest points of each lens in the camera optical lens 30.

TABLE 11

| | Number(s) of inflexion points | Inflexion point position 1 | Inflexion point position 2 | Inflexion point position 3 |
|---|---|---|---|---|
| P1R1 | 1 | 0.705 | | |
| P1R2 | 1 | 0.245 | | |
| P2R1 | 1 | 0.455 | | |

TABLE 11-continued

| | Number(s) of inflexion points | Inflexion point position 1 | Inflexion point position 2 | Inflexion point position 3 |
|---|---|---|---|---|
| P2R2 | 1 | 0.195 | | |
| P3R1 | 1 | 0.695 | | |
| P3R2 | 1 | 0.825 | | |
| P4R1 | 1 | 0.685 | | |
| P4R2 | 2 | 0.705 | 1.175 | |
| P5R1 | 3 | 0.205 | 0.945 | 1.515 |
| P5R2 | 1 | 0.355 | | |

TABLE 12

| | Number of arrest points | Arrest point position 1 | Arrest point position 2 |
|---|---|---|---|
| P1R1 | 0 | | |
| P1R2 | 1 | 0.435 | |
| P2R1 | 1 | 0.655 | |
| P2R2 | 1 | 0.245 | |
| P3R1 | 0 | | |
| P3R2 | 0 | | |
| P4R1 | 1 | 0.925 | |
| P4R2 | 2 | 1.145 | 1.205 |
| P5R1 | 1 | 0.385 | |
| P5R2 | 1 | 1.135 | |

In addition, in the subsequent Table 13, various parameters of Embodiments 3 and values corresponding to the parameters specified in the above conditions are shown.

Figure 10:
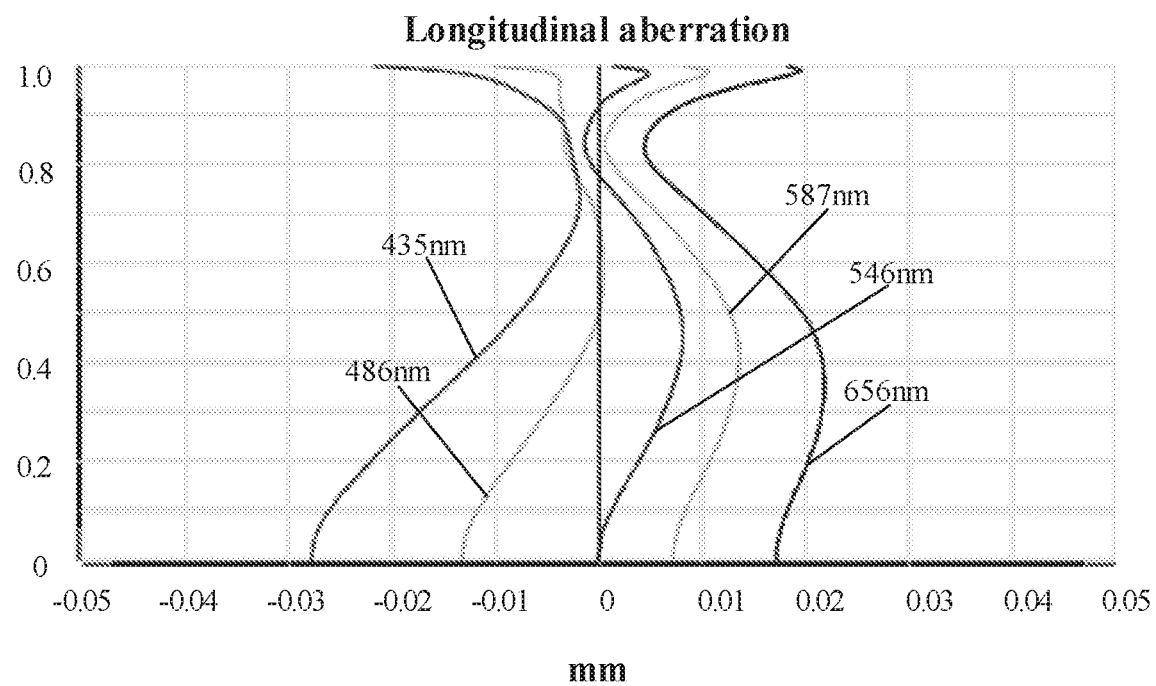
FIG. 10 is a schematic diagram of a longitudinal aberration of the camera. optical lens shown in FIG. 9.
Figure 11:
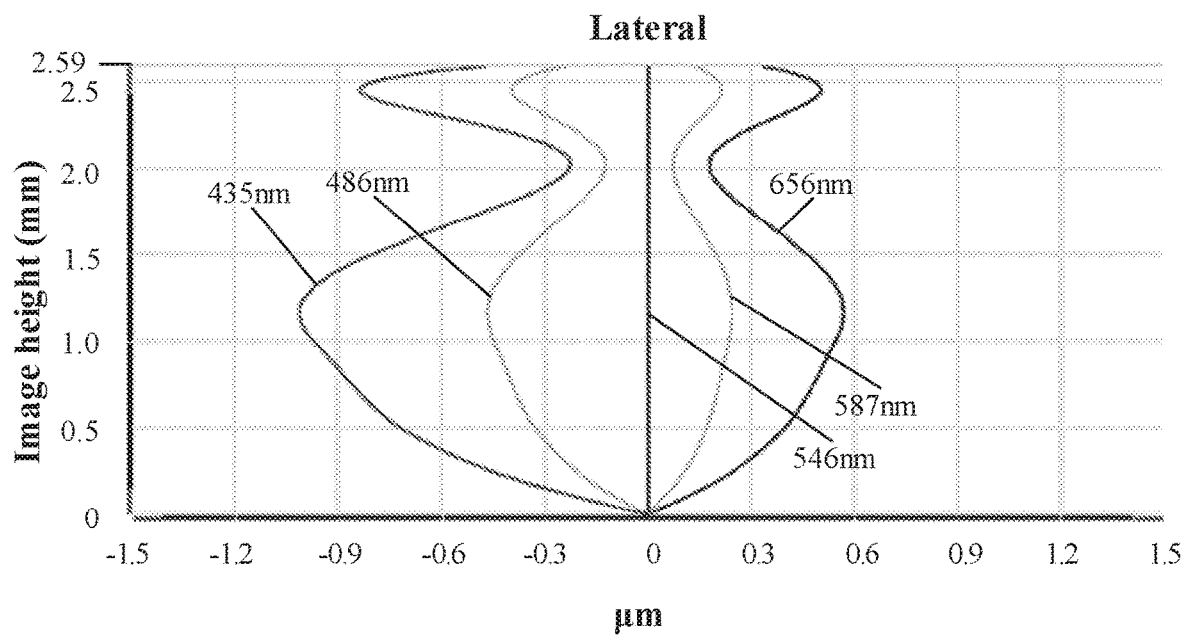
FIG. 11 is a schematic diagram of a lateral color of the camera optical lens shown in FIG. 9.
Figure 12:
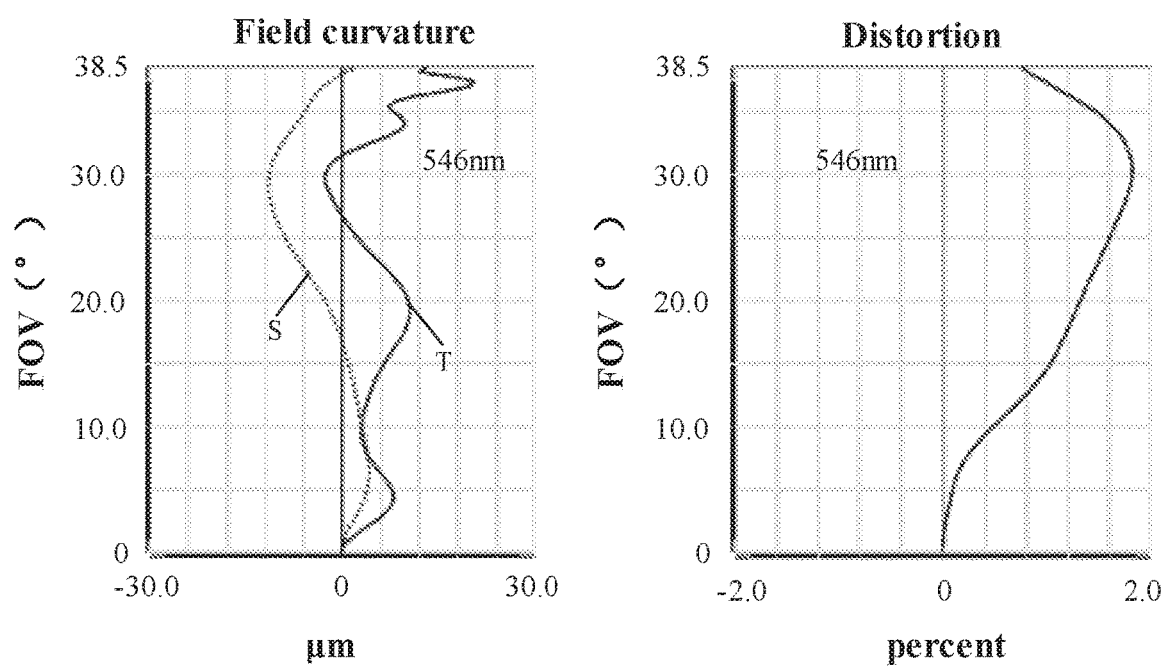
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 435 nm, 486 nm, 587 nm, 546 nm and 656 nm after passing the camera optical lens 30. FIG. 12 illustrates a field curvature and a distortion of light with a wavelength of 546 nm after passing the camera optical lens 30. A field curvature S in FIG. 12 is a field curvature in a sagittal direction, and T is a field curvature in a tangential direction.

In an embodiment, an entrance pupil diameter of the camera optical lens 30 is 1.564 mm, an image height of 1.0H is 2.59 mm, and an FOV (field of view) in the diagonal direction is 77.00°. Thus, the camera optical lens 30 has a large aperture, and is wide-angle and ultra-thin, thereby achieving excellent optical characteristics.

Table 13 in the following shows values corresponding to the conditions and values of other relevant parameters according to the aforementioned conditions in the Embodiment 1, Embodiment 2 and Embodiment 3.

TABLE 13

| Parameters and conditions | Embodiment 1 | Embodiment 2 | Embodiment 3 |
|---|---|---|---|
| f | 3.069 | 3.126 | 3.190 |
| f1 | 2.675 | 2.532 | 3.126 |
| f2 | −5.037 | −14.221 | −10.984 |
| f3 | 28.234 | −17.165 | −306.943 |
| f4 | 2.707 | 2.886 | 3.531 |
| f5 | −2.406 | −2.048 | −2.636 |
| f12 | 4.611 | 2.950 | 4.116 |
| Fno | 2.04 | 2.04 | 2.04 |
| R5/R6 | 0.64 | 0.50 | 0.74 |
| f1/f | 0.87 | 0.81 | 0.98 |
| d3/d4 | 1.03 | 0.83 | 1.13 |
| d7/d8 | 1.81 | 2.48 | 1.66 |
| R4 | 3.24 | 10000000.00 | 99990000000.00 |

Although the disclosure is illustrated and described herein with reference to specific embodiments, the disclosure is not intended to be limited to the details shown. Rather, various modifications may be made in the details within the scope and range of equivalents of the claims and without departing from the disclosure.

What is claimed is:

1. A camera optical lens comprising, from an object side to an image side:
    a first lens having a positive refractive power;
    a second lens having a negative refractive power;
    a third lens having a positive refractive power;
    a fourth lens having a positive refractive power; and
    a fifth lens having a negative refractive power;
    wherein the camera optical lens satisfies following, conditions:

$0.50 \leq R5/R6 \leq 0.75$;

$0.80 \leq f1/f \leq 1.00$;

$0.80 \leq d3/d4 \leq 1.15$;

$1.65 \leq d7/d8 \leq 2.50$; and $0.00 \leq R4$;

where
    R5 denotes a curvature radius of the object-side surface of the third lens;
    R6 denotes a curvature radius of the image-side surface of the third lens;
    f denotes a focal length of the camera optical lens;
    f1 denotes a focal length of the first lens;
    d3 denotes an on-axis thickness of the second lens;
    d4 denotes an on-axis distance from the image-side surface of the second lens to the object-side surface of the third lens;
    d7 denotes an on-axis thickness of the fourth lens;
    d8 denotes an on-axis distance from the image-side surface of the fourth lens to the object-side surface of the fifth lens; and
    R4 denotes a curvature radius of the image-side surface of the second lens.

2. The camera optical lens according to claim 1, wherein the camera optical lens further satisfies a condition of:

$2.00 \leq R9/R10 \leq 5.00$;

where
    R9 denotes a curvature radius of the object-side surface of the fifth lens; and
    R10 denotes a curvature radius of the image-side surface of the fifth lens.

3. The camera optical lens according to claim 1, wherein the camera optical lens further satisfies following conditions:

$-3.29 \leq (R1+R2)/(R1-R2) \leq -0.77$; and $0.06 \leq d1/TTL \leq 0.24$;

where
    R1 denotes a curvature radius of the object-side surface of the first lens;
    R2 denotes a curvature radius of the image-side surface of the first lens;
    d1 denotes an on-axis thickness of the first lens; and
    TTL denotes a total optical length from the object-side surface of the first lens to an image surface of the camera optical lens along an optical axis.

4. The camera optical lens according to claim 1, wherein the camera optical lens further satisfies following conditions:

$$-9.10 \leq f2/f \leq -1.09;$$

$$-2.00 \leq (R3+R4)/(R3-R4) \leq 1.62; \text{ and}$$

$$0.03 \leq d3/TTL \leq 0.09;$$

where
f2 denotes a focal length of the second lens;
R3 denotes a curvature radius of the object-side surface of the second lens; and
TTL denotes a total optical length from the object-side surface of the first lens to an image surface of the camera optical lens along an optical axis.

5. The camera optical lens according to claim 1, wherein the camera optical lens further satisfies following conditions:

$$-192.44 \leq f3/f \leq 13.80;$$

$$-13.44 \leq (R5+R6)/(R5-R6) \leq -2.01; \text{ and}$$

$$0.04 \leq d5/TTL \leq 0.17;$$

Where
f3 denotes a focal length of the third lens;
d5 denotes an on-axis thickness of the third lens; and
TTL denotes a total optical length from the object-side surface of the first lens to an image surface of the camera optical lens along an optical axis.

6. The camera optical lens according to claim 1, wherein the camera optical lens further satisfies following conditions:

$$0.44 \leq f4/f \leq 1.66;$$

$$0.27 \leq (R7+R8)/(R7-R8) \leq 2.53; \text{ and}$$

$$0.07 \leq d7/TTL \leq 0.25;$$

where
f4 denotes a focal length of the fourth lens;
R7 denotes a curvature radius of the object-side surface of the fourth lens;
R8 denotes a curvature radius of the image-side surface of the fourth lens; and
TTL denotes a total optical length from the object-side surface of the first lens to an image surface of the camera optical lens along an optical axis.

7. The camera optical lens according to claim 1, wherein the camera optical lens further satisfies following conditions:

$$-1.65 \leq f5/f \leq -0.44;$$

$$0.75 \leq (R9+R10)/(R9-R10) \leq 4.22; \text{ and}$$

$$0.04 \leq d9/TTL \leq 0.3;$$

where
f5 denotes a focal length of the fifth lens;
R9 denotes a curvature radius of the object-side surface of the fifth lens;
R10 denotes a curvature radius of the image-side surface of the fifth lens;
d9 denotes an on-axis thickness of the fifth lens; and
TTL denotes a total optical length from the object-side surface of the first lens to an image surface of the camera optical lens along an optical axis.

8. The camera optical lens according to claim 1, wherein the camera optical lens further satisfies a condition of:

$$TTL/IH \leq 1.52;$$

where
TTL denotes a total optical length from the object-side surface of the first lens to an image surface of the camera optical lens along an optical axis; and
IH denotes an image height of the camera optical lens.

9. The camera optical lens according to claim 1, wherein the camera optical lens further satisfies a condition of:

$$FOV \geq 77.00°;$$

where
FOV denotes a field of view of the camera optical lens.

10. The camera optical lens according to claim 1, wherein the camera optical lens further satisfies a condition of:

$$Fno \leq 2.05;$$

where
Fno denotes an F number of the camera optical lens.

* * * * *